United States Patent
Reinhardt et al.

(10) Patent No.: US 11,560,120 B2
(45) Date of Patent: Jan. 24, 2023

(54) METHOD FOR OPERATING A FUNCTIONAL UNIT OF A MOTOR VEHICLE BY MEANS OF AN IDENTIFICATION SYSTEM, IN WHICH TWO AUTHORIZATIONS ARE NECESSARY, AND AN IDENTIFICATION SYSTEM

(71) Applicant: DAIMLER AG, Stuttgart (DE)

(72) Inventors: Matthias Reinhardt, Sindelfingen (DE); Verena Lutterbeck, Gärtringen (DE); Yousif Hanna, Ostelsheim (DE); Martin Lallinger, Lindenberg (DE); Karl-Juergen Peters, Gaeufelden (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 95 days.

(21) Appl. No.: 17/261,312

(22) PCT Filed: Jul. 11, 2019

(86) PCT No.: PCT/EP2019/068715
§ 371 (c)(1),
(2) Date: Jan. 19, 2021

(87) PCT Pub. No.: WO2020/016101
PCT Pub. Date: Jan. 23, 2020

(65) Prior Publication Data
US 2021/0339706 A1 Nov. 4, 2021

(30) Foreign Application Priority Data
Jul. 20, 2018 (DE) ..................... 10 2018 005 763.2

(51) Int. Cl.
*B60R 25/24* (2013.01)
*B60R 25/31* (2013.01)

(52) U.S. Cl.
CPC ............ *B60R 25/245* (2013.01); *B60R 25/31* (2013.01)

(58) Field of Classification Search
CPC ....... B60R 25/245; B60R 25/31; B60R 25/24; G07C 2009/00555; G07C 2209/63
See application file for complete search history.

(56) References Cited

U.S. PATENT DOCUMENTS

| 8,547,253 B2 | 10/2013 | Proefke et al. |
| 2005/0038574 A1 | 2/2005 | Gila et al. |

(Continued)

FOREIGN PATENT DOCUMENTS

| CN | 102012506 A | 4/2011 |
| CN | 103661245 A | 3/2014 |

(Continued)

OTHER PUBLICATIONS

Examination Report dated Sep. 25, 2018 in related/corresponding DE Application No. 10 2018 005 763.2.

(Continued)

*Primary Examiner* — Vernal U Brown
(74) *Attorney, Agent, or Firm* — Patent Portfolio Builders PLLC (57) ABSTRACT

A method for operating functional unit of a motor vehicle using an identification system, in which at least a first authorization is requested for operating the functional unit and an identification signal is transmitted to an identification device by an identification element of the identification system. The functional unit is operated after receiving and the functional unit is only operated in a second authorization. The second authorization is generated by the identification device. Using the identification device, a first signal duration of the identification signal is determined for determining a first spacing of the identification element at a first (Continued)

point in time, and a second signal duration of the identification signal is determined for determining a second spacing of the identification element at a second point in time, and the second authorization is generated depending on a comparison.

16 Claims, 3 Drawing Sheets

(56) References Cited

U.S. PATENT DOCUMENTS

| | | | |
|---|---|---|---|
| 2008/0039114 A1* | 2/2008 | Phatak | G01S 5/0252 |
| | | | 455/456.1 |
| 2016/0261291 A1* | 9/2016 | Colella | H04B 1/0064 |
| 2017/0342750 A1 | 11/2017 | Hiramine | |
| 2019/0061686 A1 | 2/2019 | Neuhoff et al. | |
| 2019/0061689 A1 | 2/2019 | Breer et al. | |
| 2019/0168712 A1* | 6/2019 | Yakovenko | B60R 25/24 |
| 2019/0292839 A1* | 9/2019 | Kim | G01S 13/08 |

FOREIGN PATENT DOCUMENTS

| | | |
|---|---|---|
| CN | 103670121 A | 3/2014 |
| CN | 105051794 A | 11/2015 |
| CN | 108136999 A | 6/2018 |
| DE | 10064141 A1 | 7/2002 |
| DE | 10212648 A1 | 10/2003 |
| DE | 102014226925 A1 | 6/2016 |
| DE | 102017103187 A1 | 8/2017 |
| DE | 102017103201 A1 | 8/2017 |
| EP | 1643458 A2 | 4/2006 |
| JP | 2015098695 A | 5/2015 |
| WO | 03081516 A1 | 10/2003 |

OTHER PUBLICATIONS

International Search Report dated Oct. 17, 2019 in related/corresponding International Application No. PCT/EP2019/068715.
Written Opinion dated Oct. 17, 2019 in related/corresponding International Application No. PCT/EP2019/068715.
Office Action dated Apr. 1, 2022 in related/corresponding CN Application No. 201980048380.7.

* cited by examiner

Fig.1
(State of the Art)

METHOD FOR OPERATING A FUNCTIONAL UNIT OF A MOTOR VEHICLE BY MEANS OF AN IDENTIFICATION SYSTEM, IN WHICH TWO AUTHORIZATIONS ARE NECESSARY, AND AN IDENTIFICATION SYSTEM

BACKGROUND AND SUMMARY OF THE INVENTION

Exemplary embodiments of the invention relate to a method for operating a functional unit of a motor vehicle by means of an identification system. At least one first authorization is required to operate the functional unit. By means of a mobile identification element, an identification signal is transmitted as authorization to the identification device of the identification system, and after the identification signal is received, the functional unit is operated. Furthermore, exemplary embodiments of the invention relate to an identification system.

It is known that there is a requirement that an identification element must be located within the operating range of the motor vehicle in order for a functional unit of the motor vehicle to be operated. By way of example, this functional unit can cause the motor vehicle to be unlocked. The principle of Keyless-Go is to be mentioned as an example in the series production of motor vehicles. In this method, only the key or the identification element has to be brought within a distance of approximately 1.5 meters from the motor vehicle so that it is unlocked. As soon as the user touches the door handle, an unlocking of the motor vehicle is triggered. In accordance with prior art, the permissible operating range is ensured by the fact that the motor vehicle generates a low-frequency field, which is received by the key. The maximum effective range is determined by an evaluation of the field strength received by the key.

It is known that the effective range of the motor vehicle can be extended "maliciously". In order to prevent this, it is known that the distance between the motor vehicle and the identification element can also be determined, wherein, in particular, a duration of the identification signal can be measured and used as a basis for the determination. Thus, a malicious increase of the effective range can be formally prevented.

A distance measurement based on a measurement of durations of electromagnetic waves brings new challenges. A broadband identification signal is usually used for the duration measurement, which operates in a carrier frequency in the gigahertz range (see also radar, for example). The propagation properties of such high-frequency waves differ significantly from those of low-frequency waves. The penetration of bodies is to be mentioned, for example. The penetration of the human body is not a problem for a low-frequency wave. In contrast, for a high-frequency wave in the gigahertz range, a penetration of the human body is almost impossible.

To counteract this problem, it is known from the prior art that a motion sensor is implemented in the key, i.e., a passive key is not used for distance measurement. The disadvantage of this is that not all conceivable cases are solved. Furthermore, the measure only works if the identification element is not in motion. Furthermore, it is problematic that additional space and additional costs arise for the identification element.

Furthermore, it is known from the prior art that the distance determined by the identification device in a permissible way is strongly limited. This has the disadvantage that the availability decreases, since in many cases only one of the antennas available on the vehicle is able to determine a valid distance value. If the communication path to this antenna is obstructed by external influences, e.g., body attenuation, no distance can be determined. As a result, a valid and permissible access request for a user cannot be executed.

DE 10 064 141 A1 discloses a code generator used to perform a question-answer dialogue when approaching an object from a certain position. Depending on the position of the code generator, different control commands are executed in the object if the answer signal proves to be justified.

DE 10 2017 103 201 A1 discloses a method for a security system of a motor vehicle, in particular for a keyless activation of at least one security function of the vehicle.

DE 10 2014 226 925 A1 discloses a method for access verification of a motor vehicle, in which the distance of a transponder unit from the vehicle is determined at least twice at a predetermined time interval, the determined distances are compared with each other and the vehicle remains locked if the determined distances are the same.

DE 10 212 648 A1 discloses a portable code generator, which emits a response signal when triggered, which contains code information characteristic for the code generator. In a receiving unit arranged on the object side, which is connected to an evaluation unit, the code information contained in the received response signal is compared with a piece of reference code information. In addition, both the spacing of the code generator from the receiving unit and the receiving level of the response signal are measured on the object side and the position of the code generator is determined from this. This also allows a distinction to be made between the position of the code generator in the exterior and the interior. Only if the code generator is recognized as being in an approved position is access is approved and usage allowed.

Exemplary embodiments of the present invention are directed to a method as well and identification system by means of which the functional unit in the motor vehicle can be operated reliably and securely.

One aspect of the invention relates to a method for operating a functional unit of a motor vehicle by means of an identification system, in which at least a first authorization is requested with the identification system for operating the functional unit. Furthermore, an identification signal is transmitted as an authorization to an identification device by means of a mobile identification element and the functional unit is operated after the identification signal has been received.

It is provided that the functional unit is only operated if the first authorization and the second authorization are present, and the second authorization is generated by means of the identification device, wherein a first signal duration of the identification signal for determining a first spacing of the identification element from the identification device at a first point in time is determined by means of the identification device. It is further provided that a second signal duration of the identification signal for determining a second spacing of the identification element from the identification device is determined at a second point in time different from the first point in time, and the second authorization is generated depending on a comparison of the determined first spacing and with the determined second spacing. Furthermore, by means of the identification device, additionally a first receiving level of the identification signal is determined at the first point in time and a second receiving level of the identification signal is determined at the second point in time, and additionally the second authorization is generated depending on a receiving level comparison of the determined first receiving level with the determined second receiving level.

The first receiving level and the second receiving level are compared with at least one reference receiving level stored in a storage medium to determine a first distance of the identification element from the identification device at the first point in time and a second distance at the second point in time, and the second authorization is generated depending on a comparison of the first distance with the second distance.

In this way, it is possible that a movement of the identification element can be reliably detected. In particular, the functional unit can then be operated depending on the detected movement and depending on the transmitted identification signal. In particular, the motor vehicle can thus be opened, for example. Thus the functional unit can be operated reliably based on two authorizations. In particular, this is still very easily possible, since the two authorizations can be generated independently of any user action. Overall, the functional unit of the motor vehicle can be operated comfortably and still reliably and securely.

In other words, as soon as the motor vehicle and the identification element, which can be designed in particular as a key, have found each other (reception of the identification signal), a cyclic distance measurement is started, wherein the cyclic distance measurement has at least two distance measurements at different points in time. If the identification element then approaches the motor vehicle, which corresponds to a usual situation, it can be assumed that a subsequent triggering of the functional element corresponds to a real user request.

In particular, a so-called "LF-polling" and a distance measurement based on the speed of light is already possible in modern motor vehicles. "LF-polling" stands for a low-frequency field with a short range, for example ten meters, which is cyclically emitted by the motor vehicle. If the low-frequency field is detected by the associated identification element, which can be the vehicle key in particular, it signals its presence. Subsequently, the motor vehicle has various possibilities to initiate functions, for example light production.

The distance can be determined by means of a second way. In particular, this prevents malicious use of the functional unit, since the second authorization is only generated when the spacing measurement is based on the duration and the distance measurement is based on the received level. Thus, a movement measurement of the identification element can be performed by means of two different ways, such that, in particular by means of the receiving level comparison, a verification of the spacing determination can be performed by means of the signal duration measurement. In particular, it is thus further possible to avoid existing physical effects like reflections or shadowing even more reliably, since the verification can take place by means of the receiving level measurement. Wrong distance measurements, based on varying values due to reflections, can in particular be prevented, since the verification is carried out based on the received level. Thus, a movement interpretation based on the reflections of the signals and the corresponding signal duration measurements can in particular also be prevented, since the distance measurement is additionally carried out based on received levels, which are independent from reflections, for example. This enables an even more reliable operation of the functional unit. The field strength measurement is carried out with the low-frequency field (LF field), since this is quite robust against body shadowing and the field strength can hardly be disturbed by body shadowing.

By way of example, a corresponding distance based on the receiving levels can be stored on the storage medium by field tests. This can, for example, be stored in a so-called look-up table. It is then possible to compare the respective receiving level with the reference receiving level on the storage device. This makes it possible to determine a respective distance of the identification element to the identification device, in particular to the motor vehicle, by means of the comparison. In particular, the two determined distances can then also be compared with each other based on the receiving levels, which means that if there is a difference between the two distances, a movement of the identification element can be concluded. This in turn leads to a movement measurement of the identification element being carried out. In particular, the spacing and the distance of the identification element can then be reliably determined by the movement measurement based on the signal duration measurement and the movement measurement based on the receiving level measurement. Thus, a verification of the movement measurement is implemented. This leads to a secure operation of the functional unit of the motor vehicle.

Furthermore, high availability is enabled by the method according to the invention, which means that a measurement can always be carried out as successfully as possible, since, in particular, a plurality of receiving devices of the motor vehicle, in particular the identification device, can be included in the method.

In the sense of high availability, the goal is therefore to include the respective receiving devices, wherein it is sufficient if only one receiving device can determine a distance. This can prevent the human body, for example, from disturbing the communication between the identification device so strongly that this cannot determine a distance. In particular, a plurality of receiving devices of the motor vehicle could be used to determine a measurement result. This makes it possible, in particular, that even if the identification signal is maliciously extended, the functional unit or the vehicle function is not operated until a movement of the vehicle key is identified. In this way, malicious access to the motor vehicle can be prevented. A high availability can nevertheless be implemented.

In particular, it can be provided that the functional unit is designed as an unlocking device of the motor vehicle. By way of example, the unlocking device of the motor vehicle can be provided as a Keyless-Go function, such that the motor vehicle can be unlocked accordingly without any user intervention and only when the user approaches the motor vehicle. Furthermore, it can also be provided that, for example, a car trunk opening device can be operated as a functional unit, such that the car trunk door can open accordingly when the user approaches the car trunk. This list is to be regarded as purely exemplary and by no means as exclusive. Thus, further functional units, for example a light device of the motor vehicle, can also be correspondingly operated by means of the method according to the invention.

According to an advantageous design, the second authorization is generated when the determined first spacing from the determined second spacing is exceeded. In other words, if the first spacing is different from the second spacing, the second authorization is generated. In particular, a movement can be identified at a first spacing and a different second spacing. Thus, it can be excluded that it is a passive identification element. In particular, the second authorization is generated and the functional unit is operated only when a movement of the identification element is detected.

In particular, it can be provided that a tolerance range is defined in which the difference between the first spacing and the second spacing must be located. By way of example, it can be provided that the identification element has only moved a few centimeters within a predetermined time interval, such that no second authorization is generated. In particular, it can be provided that, if a movement from the first spacing to the second spacing has taken place within the predetermined time interval, the second authorization is generated. In particular, this allows the movement of the identification element to be reliably detected, whereby the vehicle can be operated reliably and precisely.

It has also proved to be advantageous if the second authorization is generated when the first spacing is greater than the second spacing. In other words, if the first spacing is greater than the second spacing, the identification element approaches the motor vehicle. In particular, this is the normal case in which the user with the identification element wishes the motor vehicle to be unlocked, for example. Only when an approach and, for example, no distance of the identification element from the motor vehicle can be determined, is the second authorization generated and the functional unit operated. In this way, it can be ruled out, for example, that walking past the motor vehicle with the identification element will lead to an operation of the functional unit. Thus, the functional unit of the motor vehicle can be operated reliably and comfortably depending on the situation.

In an advantageous design, the identification signal is received by means of a plurality of receiving devices, in particular four receiving devices, of the identification device and a respective signal duration measurement and a respective spacing determination from the respective receiving devices are carried out at the first point in time and at the second point in time. In particular, it can be provided that the receiving devices are arranged in different places in the motor vehicle. By way of example, a first receiving device can be arranged on a left side on a front area of the motor vehicle and a second receiving device can be arranged on a right side in the front area of the motor vehicle. It may also be possible that a third receiving device can be located in a rear area of the motor vehicle on a right side of the motor vehicle. It can also be provided that a fourth receiving device can be located on a left side in the rear area of the motor vehicle. This makes it possible that the identification signal can be received by means of four different receiving devices respectively and a respective distance measurement from the respective receiving element can be carried out. Thus it can be prevented, for example, that a low availability is implemented due to the high-frequency identification signal. In particular, this means that, for example, coverages due to the human body, which would then in turn seal off the high-frequency identification signal from, for example, one receiving device, can be received by other receiving devices, such that the identification signal can be reliably received and an access determination can be carried out. The receiving device can also be referred to as an antenna. This enables increased availability of the operation of the functional unit, such that the functional unit of the motor vehicle can be operated reliably and securely.

It has also proved to be advantageous if a position of the identification element is determined relative to the motor vehicle, depending on the respectively determined distances of the respective receiving devices. In particular by using different receiving devices, an exact position of the identification element relative to the motor vehicle can be determined on the basis of different signal duration measurements. This makes it possible, for example, that if the user approaches from a left side of the motor vehicle, a left side of the motor vehicle can be unlocked. By way of example, if the user approaches from a right side of the motor vehicle, a right side of the motor vehicle can be unlocked. Likewise it is possible, if the user approaches a rear range of the motor vehicle, that a car trunk lid can then be unlocked, for example. Thus, the functional unit of the motor vehicle can be operated very comfortably and nevertheless reliably.

In a further advantageous design form, the spacing is only taken into account in the comparison if the respective spacing falls below a predetermined spacing threshold. In other words, for example, the second authorization can only be generated when the identification element approaches the motor vehicle at less than 1.5 meters. This prevents, in particular, a signal which is emitted at a large spacing, for example maliciously generated, from being taken into account. Thus, the second authorization is only generated when the user is at a predetermined spacing from the motor vehicle. In this way, the functional unit of the motor vehicle can be operated securely and still reliably.

According to a further advantageous design, at least one first receiving level comparison of a first receiving device of the identification device and at least one second receiving level comparison of a second receiving device of the identification device is carried out, and the first receiving level comparison is compared with the second receiving level comparison, and depending on this, the receiving device is selected to determine a distance of the identification element from the selected receiving device. In other words, it is provided that first the presence of the identification element is determined by the first receiving unit and by the second receiving unit. A signal duration measurement of the first receiving device and the second receiving device is carried out. In particular simultaneously, for each spacing measurement, the received power, in particular the corresponding receiving level or equivalent parameters, such as RSSIGC for example, is detected, such that the distance measurement can be carried out. If a distance measurement via a receiving device exceeds the requirement of the maximum permissible distance, it will not be considered further. In particular, it can then be provided that, by means of the formula:

$$10^{\frac{P_{spacing_{db}}}{10}} \cdot (\text{spacing})^2 = k = \text{constant}$$

a respective constant $k_{ANT\_x}$ is calculated. The determined constant $k_{ANT\_x}$ is then compared with the reference level values, which, in particular, occurs in the clearance under ideal propagation conditions. A qualification can then be made by comparing, which is also referred to as $dk_x$, the real key distance/identification element distance. In particular, only distance measurements whose $\Delta k_x$ have small values are preferred.

In other words, a first distance measurement is carried out by means of the receiving level measurement of the identification element. A second receiving level measurement is carried out at a second point in time by means of the identification element. The receiving level measurements are carried out for at least two receiving devices. A plausibility check is performed and the receiving device that has the lowest possible $dk_x$ in both measurements at the two different points in time is searched for. For the found receiving device, the distance is compared and it is evaluated whether the identification element has actually moved in the direction of the motor vehicle, in other words has approached it. As a criterion, it could be considered, for example, that a difference of the first measurement to the second measurement is 0.5 meters. It is also possible that further measurements can be made if the required distance difference is not large enough, for example, due to a user who is talking and not approaching and therefore does not want the motor vehicle to open.

The constant $k_0$ can be permanently stored, for example, by a production adjustment (measurement of the field strength or similar) in the case of an identification element aligned in a defined manner and a known spacing/distance. By way of example, this can be set in the sensor in such a way that the control unit to be evaluated can work with a fixed value, regardless of which sensor the data comes from.

A further aspect of the invention relates to an identification system, which has an identification device and an identification element and having an electronic computing device, wherein the identification system is designed to perform the method according to the preceding aspect or an advantageous form thereof. In particular, the method is performed by means of the identification system. The identification system is in particular designed in a motor vehicle.

Advantageous designs of the method are to be regarded as advantageous designs of the motor vehicle. For this purpose, the motor vehicle has objective features which enable the method or an advantageous design thereof to be carried out.

The motor vehicle is in particular designed as a passenger car.

Further advantages, features and details of the invention arise from the following description of preferred exemplary embodiments and from the drawings. The features and combinations of features mentioned above in the description as well as the features and combinations of features mentioned below in the description of the figures and/or shown in the figures alone can be used not only in the combination specified in each case, but also in other combinations or on their own without leaving the scope of the invention.

BRIEF DESCRIPTION OF THE DRAWING FIGURES

Here are shown.

In the figures, identical or functionally identical elements are provided with the same reference numerals.

DETAILED DESCRIPTION

Figure 1:
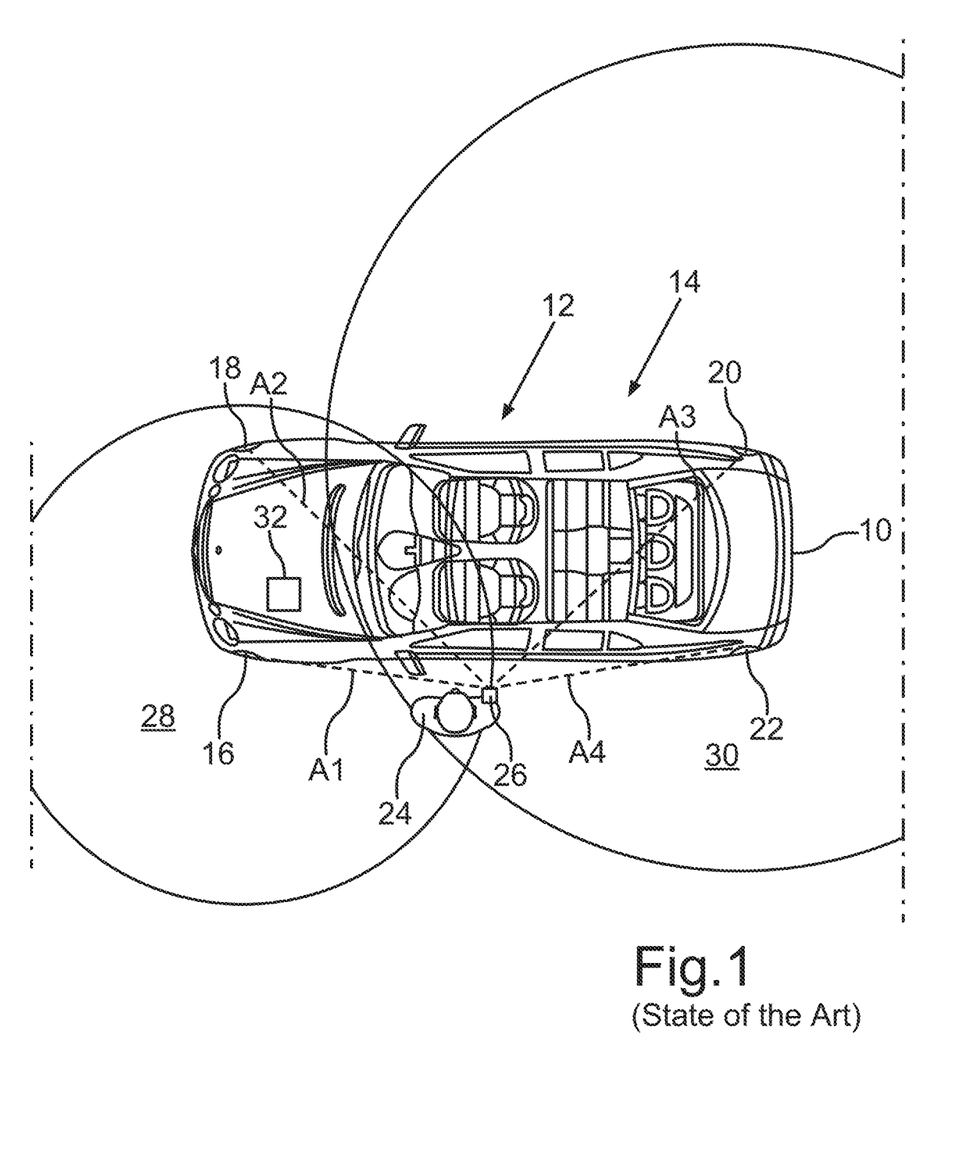
FIG. 1 a schematic top view of the motor vehicle according to the prior art.

FIG. 1 shows a schematic top view of a motor vehicle 10 according to the prior art. The motor vehicle 10 according to the prior art has an identification system 12 having an identification device 14 according to the prior art. In the present example, the identification device 14 has a first receiving device 16, a second receiving device 18, a third receiving device 20 and a fourth receiving device 22. In the present exemplary embodiment, a user 24 has an identification element 26. In particular, the identification element 26 is detected by means of the first receiving device 16 in the present exemplary embodiment and by means of the third receiving device 20. In particular, the identification element 26 sends an identification signal to the identification device 14 for this purpose. In particular, the user is located in a first receiving area 28 of the first receiving device and within a third receiving area 30 of the third receiving device.

FIG. 1 further shows that a functional unit 32 of the motor vehicle 10 is operated depending on the received identification signal. The functional unit 32 can, for example, be designed as an unlocking unit for the motor vehicle 10, such that the unlocking of the motor vehicle 10 is carried out when the identification element 26 approaches the motor vehicle 10.

According to FIG. 1, as in the prior art, it is, for example, a so-called Keyless-Go system in the present case. In this system, only the identification element 26 needs to be brought to a distance of 1.5 meters from the motor vehicle 10 in order to unlock it. As soon as the user 24 touches the door handle, the unlocking function is triggered. Today, the permissible effective range is then ensured, such that the motor vehicle 10 generates a low-frequency field, which is in particular depicted by the areas 28, 30, which receives the identification element 26. The maximum effective range is then determined by an evaluation of the field strength received in the identification element 26.

The LF antennas are located in the motor vehicles according to the prior art in the central console, in the middle near the rear seat bench (below the rear seat bench) and on every side per each LF antenna in a door (mostly rear area of the driver/passenger door).

The antennas according to the invention are UWB antennas, which are provided on the corners of the bumper and in the interior per each antenna in the C-pillar. UWB antennas are additional to the existing LF antennas in the vehicle, and form an additional feature to the prior art.

It is known that the effective range of the motor vehicle 10 can be extended "maliciously". In order to prevent this, the distance between the motor vehicle 10 and the identification element 26 can additionally be determined. A system can be used, which employs the duration of the speed of light, in particular the duration of the electromagnetic waves, as a basis for the determination. Thus, a malicious increase of the effective range can be formally prevented.

The distance measurement based on the measurement of durations of electromagnetic waves according to prior art comes with new challenges. For the duration measurement, a broadband signal is usually used, which works with a carrier frequency in the gigahertz range. The properties in the propagation of such high-frequency waves differ significantly from those of low-frequency waves. By way of example, the penetration of bodies, for example of the user 24, is to be mentioned. Thus, the penetration of the human body does not pose any problems for a low-frequency wave. In contrast, for a high-frequency wave in the gigahertz range, penetration of the human body is almost impossible. Due to this circumstance, several receiving devices 16, 18, 20, 22 are used for the duration measurement.

The disadvantage is that a high availability must be provided, which among other things, underlies the invention. In the sense of a high availability, the aim is to include all receiving devices 16, 18, 20, 22, wherein it is sufficient if only one receiving device 16, 18, 20, 22 can determine a spacing A1, A2, A3, A4. Under certain circumstances, the human body may interfere with the communication with, for example, the device 16 to such an extent that it cannot, for example, determine a first spacing A1. For this purpose, the third receiving device 20 could, for example, determine a third spacing A3. The A3 determined by the third receiving device 20 is naturally larger in the depicted case than that of the first receiving device 16 and at the same time significantly larger than the normal effective range for an identification element 26. It would be thus be possible, if the effective range of the low-frequency signal is maliciously increased, to still operate the functional unit 32 as long as one is within the permissible distance range of any receiving device 16, 18, 20, 22. In the present example, the third receiving device 20 would be the receiving device 16, 18, 20, 22 with the largest permissible area.

Figure 2:
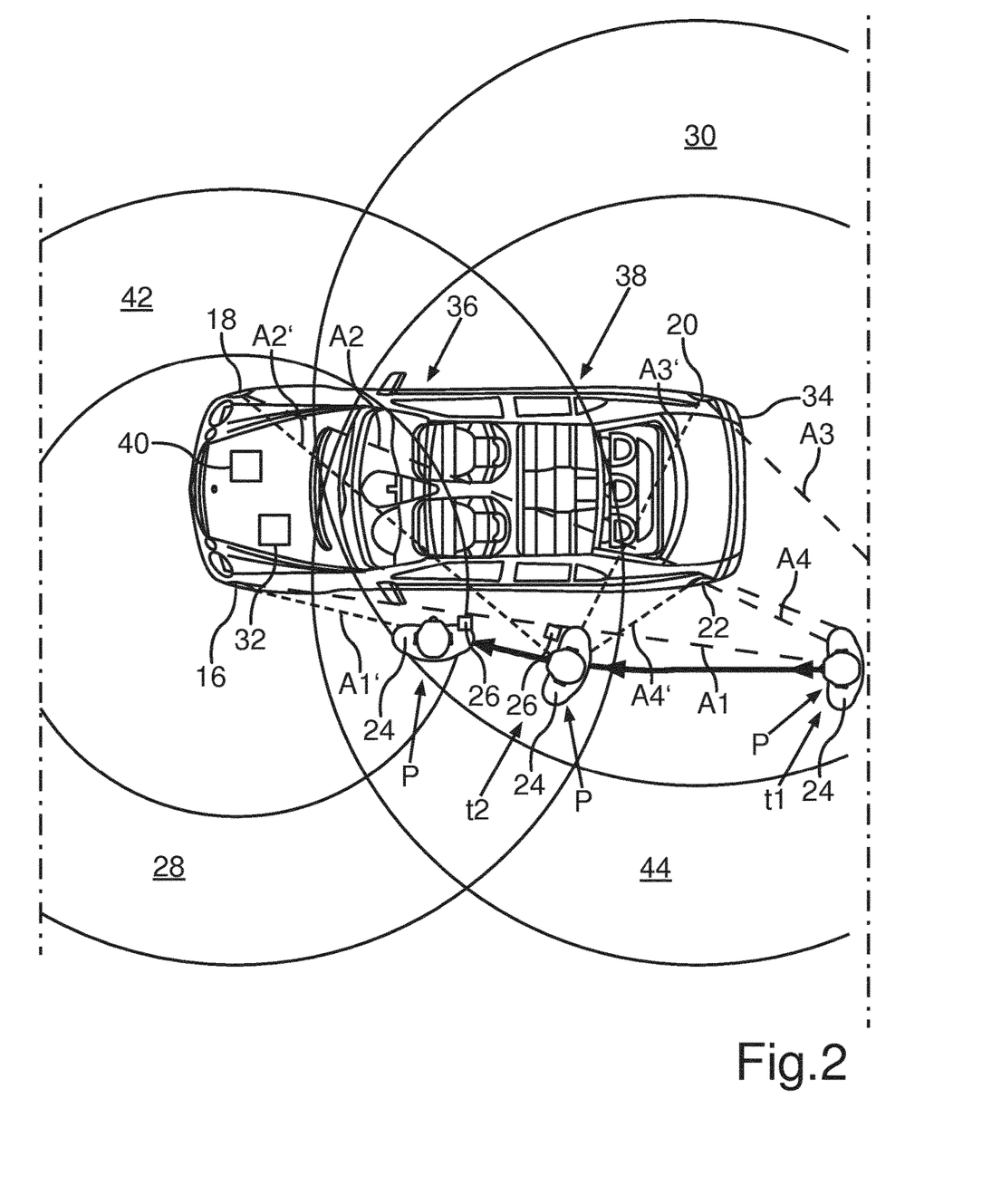
FIG. 2 a schematic top view of an embodiment of a motor vehicle having an embodiment of an identification system according to the invention.

FIG. 2 shows, in a schematic top view, an embodiment of a motor vehicle 34 according to the invention having an identification system 36 according to the invention. The identification system 36 further has an identification device 38 according to the invention, which in particular has an electronic computing device 40.

It is provided that use is made to operate the functional unit 32 of the motor vehicle 34 by means of the identification system 36. To operate the functional unit 32, at least a first authorization for operating by means of the identification device 38 of the identification system 36 is requested. By means of the mobile identification element 26 of the identification system 36, which is authorized for operation, an identification signal is transmitted as an authorization to the identification device 38 and, after receiving the identification signal as authorization, the functional unit 32 is operated by means of the identification device 38.

It is provided that the functional unit 32 is operated only if the first authorization and a second authorization are present, and the second authorization is generated by means of the identification device 38. By means of the identification device 38, a first signal duration of the identification signal for determining a first spacing A1, A2, A3, A4 of the identification element 26 relative to the identification device 38 is determined at a first point in time t1, and a second signal duration of the identification signal for determining a second spacing A1', A2', A3', A4' of the identification element 26 relative to the identification device 38 is determined at a second point in time t2 different from the first point in time t1, and the second authorization is generated depending on a comparison of the determined first spacing A1, A2, A3, A4 with the determined second spacing A1', A2', A3', A4'.

In other words, it is provided that, for example, an "LF polling" is extended with a spacing measurement based on the speed of light. "LF polling" stands for a low-frequency field with a short range, for example less than ten meters, which is cyclically emitted by the motor vehicle 34. If the low-frequency field is detected by the associated identification element 26, this signals its presence. Subsequently, the motor vehicle 34 has a wide range of options for initiating functions, for example performing a light production.

In particular, in the present exemplary embodiment, the identification device 38 has the first receiving device 16, the second receiving device 18, the third receiving device 20 and the fourth receiving device 22. The first receiving device 16 in turn has the first receiving area 28, in which the identification signal of the identification element 26 can be received. The second receiving device 18 in turn has a second receiving area 42 for receiving the identification signal. The third receiving device 30 has the third receiving area 30 for receiving the identification signal. The fourth receiving device 22 has a fourth receiving area 44 for receiving the identification signal. In particular, it is thus provided that the identification signal is received by means of a plurality of receiving devices 16, 18, 20, 22, in particular four receiving devices 16, 18, 20, 22, of the identification device 38, and a respective signal duration measurement and a respective spacing determination relative to the respective receiving devices 16, 18, 20, 22 is carried out at the first point in time t1 and at the second point in time t2.

In particular, it is further provided that the second authorization is generated if the determined first spacing A1, A2, A3, A4 from the determined second spacing A1', A2', A3', A4' is exceeded. In particular, the second authorization is generated if the first spacing A1, A2, A3, A4 is greater than the second spacing A1', A2', A3', A4'. In other words, the second authorization is only generated when the user 24 approaches the motor vehicle 34.

In particular, it can also be provided that a position P of the identification element 26 or of the user 24 relative to the motor vehicle 34 is determined depending on the respectively determined spacings A1, A2, A3, A4, A1', A2', A3', A4' of the respective receiving devices 16, 18, 20, 22. In particular, by using the different receiving devices 16, 18, 20, 22, an exact position P of the identification element 26 relative to the motor vehicle 34 can be determined based on different signal duration measurements. This makes it possible, for example, that if the user 24 approaches from a left side of the motor vehicle 34, a left side of the motor vehicle 34 can be unlocked. If the user approaches from a right side of the motor vehicle 34, for example, a right side of the motor vehicle 34 can be unlocked. It is also possible that, if the user 24 approaches from a rear area of the motor vehicle 34, for example, then a car trunk lid can be unlocked, for example. Thus, the functional unit 32 of the motor vehicle 34 can be operated very comfortably and nevertheless reliably.

Furthermore, it can in particular be provided that, only when the respective spacing A1, A2, A3, A4, A1', A2', A3', A4' falls below a predetermined spacing threshold value, is the spacing A1, A2, A3, A4, A1', A2', A3', A4' taken into account in the comparison. By way of example, the spacing threshold value can be 1.5 meters. In other words, the spacing measurement is only carried out when the identification element 26 is at a predetermined spacing A1, A2, A3, A4, A1', A2', A3', A4' from the motor vehicle 34.

Figure 3:
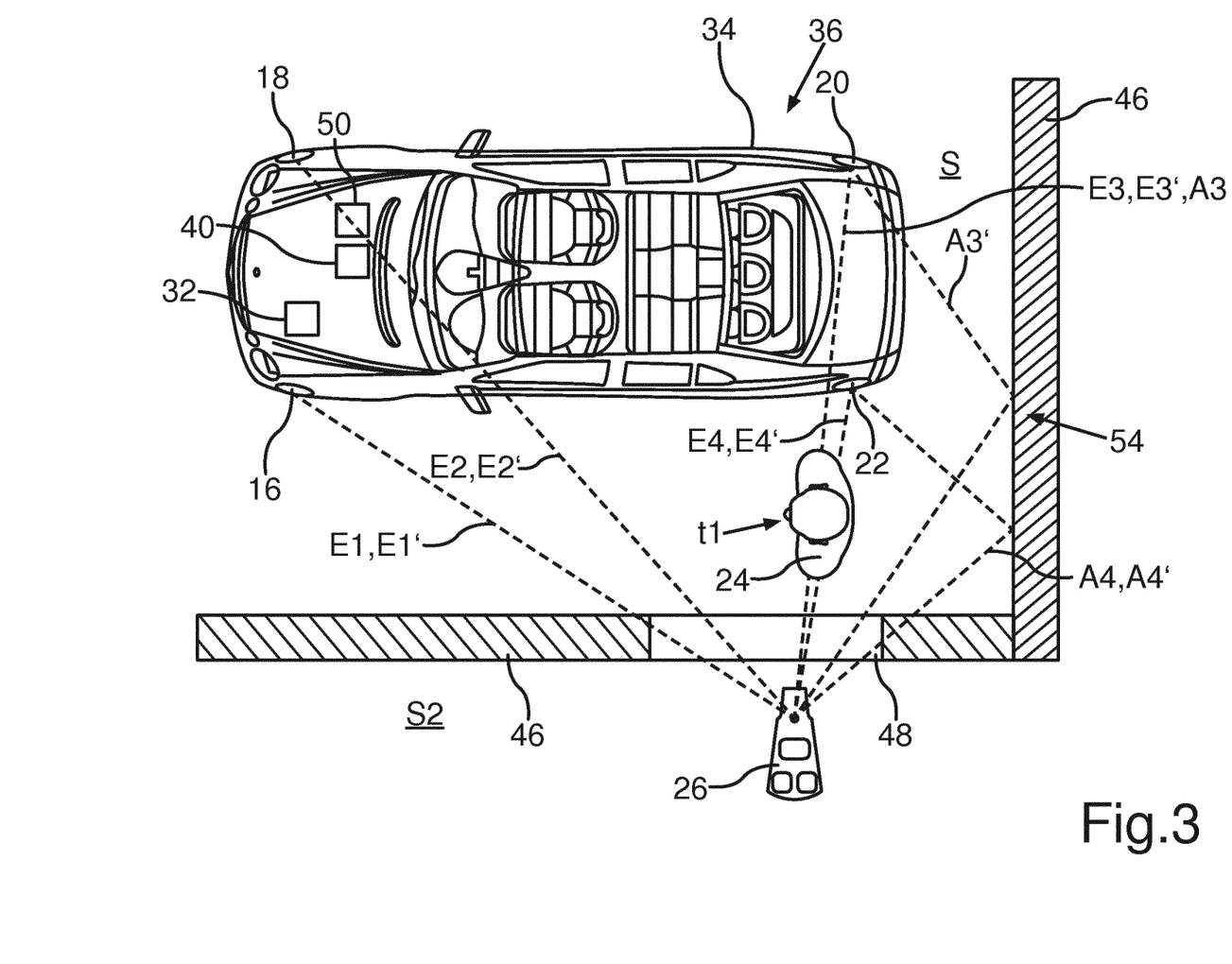
FIG. 3 a further schematic top view of an embodiment of a motor vehicle having an embodiment of an identification system according to the invention.

FIG. 3 shows, in a schematic top view, a further embodiment of the motor vehicle 34 having the identification system 36. In the present exemplary embodiment, the motor vehicle 34 is parked in a parking space S. The parking space S is in particular surrounded by a house wall 46. The house wall 46 in turn has a recess, in which a window 48 or a door can be formed, for example. In particular, it can be provided that the identification signal of the identification element 26 can be transmitted through the window 48, whereas it cannot be transmitted through the house wall 46. In particular, it can be provided that, by means of the identification device 38, additionally a first receiving level of the identification signal is determined at the first point in time t1, a second receiving level of the identification signal is determined at the second point in time t2 and additionally, the second authorization is generated depending on a receiving level comparison of the determined first receiving level with the determined second receiving level.

Furthermore, it can in particular be provided that the first receiving level and the second receiving level are compared with at least one reference receiving level stored in a storage medium 50, for example the electronic computing device 40, for determining a first distance E1, E2, E3, E4 of the identification element 26 relative to the identification device 38 at the first point in time t1 and a second distance E1', E2', E3', E4' at the second point in time t2, the second authorization is generated depending on a comparison of the first distance E1, E2, E3, E4 with the second distance E1', E2', E3', E4'.

Furthermore, at least a first receiving level comparison of a first receiving device 16, 18, 20, 22 of the identification device 38 and at least a second receiving level comparison of a second receiving device 16, 18, 20, 22 of the identification device 28 are carried out, and the first receiving level comparison is compared with the second receiving level comparison, and depending on this, one of the receiving devices 16, 18, 20, 22 is selected for determining a distance E1, E2, E3, E4, E1', E2', E3', E4' of the identification element 26 from the selected receiving device 16, 18, 20, 22.

In particular, it is thus possible that existing physical effects such as reflections or shadowing, for example, can be taken into account, whereby an improved distance measurement can be carried out.

It can be assumed, for example, as FIG. 3 shows, that the identification element 26 is fixed in place in an interior 52 of a house, wherein the motor vehicle 34 is parked in the parking space S. In particular, persons walking past the house wall 46 could then possibly influence the identification signal in such a way that the distance measurement determines varying values. In particular, this can take place on the basis of reflections. So that such scenarios are not interpreted as an identification element 26 moving towards the motor vehicle 34, the receiving level can additionally be evaluated.

In the exemplary embodiment shown in FIG. 3, the identification element 26 is arranged in the interior 52 in such a way that the identification element 26 has the smallest spacing A4, A4' from the fourth receiving device 22 and the smallest distance E4, E4'. This would then be interpreted as spacing A1, A2, A3, A4, A1', A2', A3', A4' of the identification element 26 from the motor vehicle 34.

In the present exemplary embodiment, however, the user 24 is located in the way of the beam path of the receiving device 22. Due to the house wall 46, the beam path for the fourth distance E4' is not possible at the second point in time t2. Likewise, the beam path for the fourth distance E4 is not possible at the first point in time t1, since the human body of the user 24 attenuates these waves too much, such that these paths fail. A reliable spacing determination based on the duration measurement cannot be performed in this scenario, for example. In particular, in this case, the spacing A1 from the first receiving device and the spacing A3 from the third receiving device would be selected as the smallest spacing A1, A2, A3, A4 from the identification element 26 in a signal duration measurement. In particular, if, for example, the user 24 moves in the beam path to the third receiving device 20, the spacing measurement of the receiving device 20 can change at the second point in time t2 in such a way that a longer duration is measured, although the identification element 26 has not moved. This can be interpreted in particular due to the reflections which occur in the area 54. In order to counteract this, it can be provided that the receiving level is additionally measured.

In particular, the receiving level follows the relation 6 dB/(doubling_spacing). The received field power at one of the receiving devices 16, 18, 20, 22 is quadratic to the spacing of the transmitting source:

$P_{spacing}$ Proportional $1/(\text{spacing})^2$ or by means of a yet unknown constant "K": $P_{spacing} = K*1/(\text{spacing})^2$.

Formulated differently:

$$P_{spacing} * (\text{spacing})^2 = k = \text{constant}$$

Usually, the received power exists in logarithmic form. If this is so, the above-mentioned formula can be rewritten:

$$10^{\frac{P_{spacing_{db}}}{10}} \cdot (\text{spacing})^2 = k = \text{constant}$$

Since the system determines the distance E1, E2, E3, E4, E1', E2', E3', E4', the expected receiving level can also be determined on this basis:

$$P_{spacing\_db} = 10 * \log\left(\frac{k}{(\text{spacing})^2}\right) = \text{constant}$$

In other words, it is provided that firstly the spacing A1, A2, A3, A4, A1', A2', A3', A4' from the respective receiving device 16, 18, 20, 22 is carried out starting from the identification element 26 by means of the signal duration measurement. Simultaneously, the received receiving level is recorded for each spacing measurement and a receiving level comparison is performed. If a spacing measurement via a receiving device 16, 18, 20, 22 exceeds the requirement for the maximum permissible spacing A1, A2, A3, A4, A1', A2', A3', A4', this is not considered further. A resulting constant $k_{ant\_X}$ is calculated for each individual spacing measurement. The determined constants for the respective receiving devices 16, 18, 20, 22 "$k_{ant\_X}$" are compared with a constant "$k_0$", which occurs in the clearance under ideal propagation conditions. In particular, the constant $K_0$ is the reference receiving level.

In particular, a comparison is then made by the formula:

$\Delta k_X = k_0 - k_{Ant\_X}$ where X=1, ... n.

By way of example, a comparison can also be determined by forming the quotient of "$k_0$" to "$k_{ant\_X}$" with the formula:

$$dk_X = \frac{k_0}{k_{Ant\_x}}$$

where X=1 ... n. For the further qualification of the real distance E1, E2, E3, E4, E1', E2', E3', E4', the distance measurements whose "$\Delta k_X$" have the lowest values are preferably used.

By way of example, it can be provided that a first distance measurement is carried out, wherein the identification element 26 is detected for the first time by LF polling at a first point in time t1. A duration measurement is also performed to determine a secured spacing A1, A2, A3, A4, A1', A2', A3', A4' and a distance to E1, E2, E3, E4, E1', E2', E3', E4' to the identification element. A corresponding evaluation of the recorded information is performed. At a second point in time t2, a second measurement is carried out, a signal duration measurement and a receiving level measurement. These data are also evaluated accordingly. A plausibility check takes place. A search is carried out for the receiving devices 16, 18, 20, 22 that have a lowest possible $dk_X$ in both measurements. For the found receiving devices 16, 18, 20, 22, the distance E1, E2, E3, E4, E1', E2', E3', E4' is compared and evaluated as to whether the identification element 26 has actually moved in the direction of the motor vehicle 34. As a criterion, one could, for example, use the fact that an approximation from the first measurement to the second measurement of 0.5 meters would be carried out. If necessary, further measurements are to be carried out if the required distance difference is not large enough. By way of example, this can happen if a vehicle user is talking and does not approach the motor vehicle 34.

The constant $k_0$ can be performed, for example, by a production comparison with a sensor/identification element 26 aligned in a defined manner and with a known spacing A1, A2, A3, A4, A1', A2', A3', A4' or with a known distance E1, E2, E3, E4, E1', E2', E3', E4' and stored or set in the sensor in such a way that the control device to be evaluated, in particular the electronic computing device 40, can operate with a fixed value, regardless of which sensor or receiving device 16, 18, 20, 22 the data comes from.

Overall, the invention shows LF polling with duration-distance measurement.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for operating a functional unit of a motor vehicle using an identification system, the method comprising:
   transmitting, by a mobile identification element to an identification device, a first identification signal for a first authorization with the identification system for operating the functional unit;
   transmitting, by the mobile identification element to the identification device, a second identification signal for a second authorization with the identification system for operating the functional unit;
   determining, by the identification device, a first signal duration of the first identification signal in order to determine a first spacing of the identification element from the identification device at a first point in time;
   determining, by the identification device, a first receiving level of the first identification signal at the first point in time;
   determining, by the identification device, a second signal duration of the second identification signal in order to determine a second spacing of the identification element from the identification device at a second point in time, which is different from the first point in time;
   determining, by the identification device, a second receiving level of the second identification signal at the second point in time;
   comparing, by the identification device, the first receiving level and the second receiving level with at least one reference receiving level stored in a storage medium to determine a first distance of the identification element from the identification device at the first point in time and a second distance at the second point in time; and
   operating the functional unit only if the first and second authorizations are present, wherein the second authorization is generated based on a comparison of the determined first spacing and with the determined second spacing, a receiving level comparison of the determined first receiving level with the determined second receiving level, and a comparison of the first distance with the second distance.

2. The method of claim 1, wherein the second authorization is generated if the determined first spacing is exceeded by the determined second spacing.

3. The method of claim 1, wherein the second authorization is generated if the first spacing is greater than the second spacing.

4. The method of claim 1, wherein the first and second identification signals are received by a plurality of receiving devices of the identification device, and a respective signal duration measurement and a respective spacing determination from the respective plurality receiving devices is performed at the first point in time and at the second point in time.

5. The method of claim 4, wherein a position of the identification element relative to the motor vehicle is determined depending on the respectively determined spacings of the respective plurality of receiving devices.

6. The method of claim 1, wherein the first and second spacing are only taken into account in the comparison when the respective first and second spacing falls below a predetermined spacing threshold value.

7. The method of claim 1, further comprising:
   performing a first receiving level comparison of a first one of the plurality of receiving devices of the identification device;
   performing a second receiving level comparison of a second one of the plurality of receiving devices of the identification device;
   comparing the first receiving level comparison with the second receiving level comparison; and
   selecting, depending upon the comparison of the first receiving level comparison with the second receiving level comparison, one of the first and second ones of the plurality of receiving devices to determine the first and second distances of the identification element from the selected one of the first and second receiving devices.

8. The method of claim 1, wherein the mobile identification element is a vehicle key of the motor vehicle.

9. An identification system, comprising:
   at least one identification device;
   an identification element; and
   an electronic computing device, wherein the identification system is configured to
      transmit, by the mobile identification element to the identification device, a first identification signal for a first authorization with the identification system for operating the functional unit;
      transmit, by the mobile identification element to the identification device, a second identification signal for a second authorization with the identification system for operating the functional unit;
      determine, by the identification device, a first signal duration of the first identification signal in order to determine a first spacing of the identification element from the identification device at a first point in time;

determine, by the identification device, a first receiving level of the first identification signal at the first point in time;

determine, by the identification device, a second signal duration of the second identification signal in order to determine a second spacing of the identification element from the identification device at a second point in time, which is different from the first point in time;

determine, by the identification device, a second receiving level of the second identification signal at the second point in time;

compare, by the identification device, the first receiving level and the second receiving level with at least one reference receiving level stored in a storage medium to determine a first distance of the identification element from the identification device at the first point in time and a second distance at the second point in time; and operate the functional unit only if the first and second authorizations are present, wherein the second authorization is generated based on a comparison of the determined first spacing and with the determined second spacing, a receiving level comparison of the determined first receiving level with the determined second receiving level, and a comparison of the first distance with the second distance.

10. The identification system of claim 9, wherein identification system is configured so that the second authorization is generated if the determined first spacing is exceeded by the determined second spacing.

11. The identification system of claim 9, wherein identification system is configured so that second authorization is generated if the first spacing is greater than the second spacing.

12. The identification system of claim 9, wherein the first and second identification signals are received by a plurality of receiving devices of the identification device, and the identification system is configured to perform a respective signal duration measurement and a respective spacing determination from the respective plurality receiving devices at the first point in time and at the second point in time.

13. The identification system of claim 12, wherein the identification system is configured to determine a position of the identification element relative to the motor vehicle depending on the respectively determined spacings of the respective plurality of receiving devices.

14. The identification system of claim 9, wherein the identification system is configured so that the first and second spacing are only taken into account in the comparison when the respective first and second spacing falls below a predetermined spacing threshold value.

15. The identification system of claim 9, wherein the identification system is further configured to:

perform a first receiving level comparison of a first one of the plurality of receiving devices of the identification device;

perform a second receiving level comparison of a second one of the plurality of receiving devices of the identification device;

compare the first receiving level comparison with the second receiving level comparison; and select, depending upon the comparison of the first receiving level comparison with the second receiving level comparison, one of the first and second ones of the plurality of receiving devices to determine the first and second distances of the identification element from the selected one of the first and second receiving devices.

16. The identification system of claim 9, wherein the mobile identification element is a vehicle key of the motor vehicle.

* * * * *